United States Patent Office 3,294,805
Patented Dec. 27, 1966

3,294,805
2 LOWER ALKYL-3-(4-PHENYL-4-CARBOALKOXY PIPERIDINE)LOWER ALKYL-5,6 SUBSTITUTED INDOLES
Istvan Sallay, Wynnewood, and Scott J. Childress, Newtown Square, Pa., assignors to American Home Products Corporation, New York, N.Y., a corporation of Delaware
No Drawing. Filed Oct. 23, 1963, Ser. No. 318,199
7 Claims. (Cl. 260—294.3)

This invention relates to new indole compounds. More particularly this invention relates to new alkyl indoles and to the method by which they are prepared.

The new compounds of the present invention are represented in their broadest aspect by the structural formula which follows:

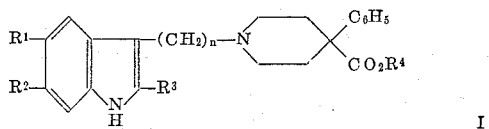

wherein $R^1$ and $R^2$ are selected from the group consisting of H and $OCH_3$ and $R^1$ and $R^2$ taken together are $—OCH_2O—$; $R^3$ is selected from the group consisting of H and $CH_3$; $R^4$ is lower alkyl having not more than 3 carbon atoms; $n$ has a value of from 2 to 3 inclusive and the pharmaceutically acceptable acid salts thereof. In the foregoing description, it is understood that $R^1$ and $R^2$ may be like or unlike, depending on the structure of the compound used in the preparation of the final product.

The reaction sequence which follows, based on Example I, portrays a preferred method of making the compounds of the present invention. It is to be understood that the specific reactants utilized are for illustrative purposes only and are not to be construed as limiting the scope of the invention either with respect to the new compounds or the method by which they are prepared.

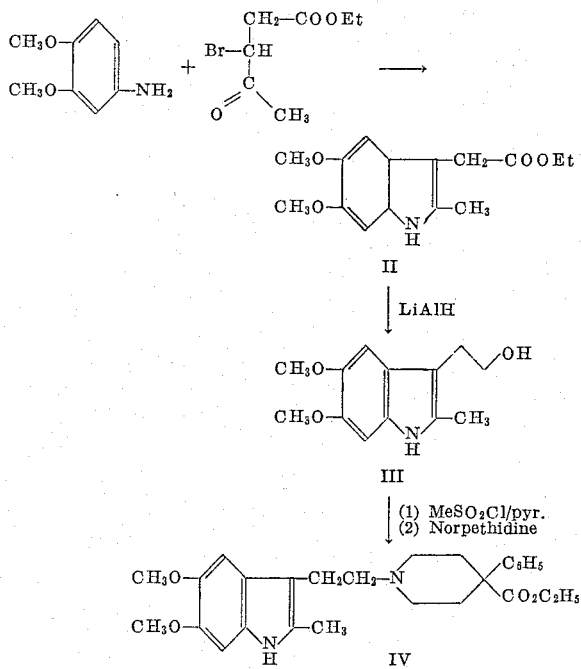

According to the foregoing reaction sequence, it will be noted that aniline, or a substituted aniline compound, as is shown, is first reacted with a halogenated ketoacid alkyl ester, such as for example 3-bromo-4-ketovaleric acid ethyl ester, by heating the same together at a temperature of from about 170° to about 190° C. for a period of from about 5 to about 20 minutes. The reaction mixture is then cooled and poured onto icy hydrochloric acid. The resulting indole ester II precipitated after purification is then dissolved in an inert solvent such as tetrahydrofuran or dioxan and dropped into a slurry of $LiAlH_4$ in tetrahydrofuran. An exothermic reaction occurs after which the reaction mixture is diluted with ether and decomposed with water. The ether-tetrahydrofuran phase furnishes an oil, the hydroxyalkylindole III, which is then dissolved in a solvent such as pyridine, and to which is added methanesulfonyl chloride. This mixture on standing results in a chloroalkyl indole which is treated 4-phenyl-4-carbalkoxypiperidine at a temperature of about 30° C. and permitted to stand for 5–15 hours. The product, in the form of the free base, is then taken up in an ether solvent. The desired final product IV is recovered on treating with dilute mineral acid in the conventional manner.

As has been suggested, the new compounds of the present invention are valuable for their pharmaceutical properties. More specifically, the new compounds of the present invention are useful as analgesics. When used for this purpose, the compounds of the present invention are preferably formed into a pharmaceutical preparation.

The latter contains the specified compound in admixture with a pharmaceutically administrable organic or inorganic carrier, such that the composition is suitable for internal or parenteral administration. The composition may be prepared in solid form, such as in tablets, or in liquid form such as a solution, suspension or emulsion. Suitable liquid carriers include water, gelatin, lactose, starch, talc, vegetable oils, alcohols, polyalcohols, gums, U.S.P. syrups and the like. The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

When the pharmaceutical preparation is compounded in the manner suggested above, the active compound will be present in an amount of from about 1 to about 500 mg./c. of the vehicle. Preferably the active compound will be present in an amount of from 1 to about 100 mg./cc. of the carrier. When so prepared, the new compounds may be administered in therapeutic dosages of from about 16 to about 100 mg.

Reference to the specific examples which follow will provide a better understanding of the new compounds of the present invention and the method by which they are prepared.

Example 1

3,4-Dimethoxyaniline (13.2 g.=0.086 mole) is combined with 3-bromo-4-ketovaleric acid ethyl ester (9.6 g.=0.043 mole) and heated in an oil bath at 180° C. for 7 minutes. The reaction mixture is cooled and poured onto icy hydrochloric acid. The gummy precipitate is ether-extracted which results in an oil (7.2 g.; 60.5% yield) after evaporation of the ether. The gummy residue is triturated with cool ethanol to furnish the indole ester, 2-methyl-5,6-dimethoxy-3-indolylacetic acid ethyl ester, (II) (2.66 g.) M.P. 81.5–83° C. UV spectrum possessed maxima at 224, 280, 298, 304 and 308 m. IR spectrum showed the expected bands at $3.03\mu$ (NH), $5.87\mu$ (ester).

The indole-ester (II) (12 g.) is then dissolved in tetrahydrofuran (125 ml.) and dropped into a slurry of $LiAlH_4$ (1.60 g.) in tetrahydrofuran (300 ml.). After the slightly exothermic reaction subsides it is stirred for another hour at room temperature. The reaction mixture is then diluted with ether (750 ml.) and decomposed with water. The ether-tetrahydrofuran phase furnishes an oil, 9.7 g. (95%), which is recrystallized from benzene-petroleum ether; M.P. 126–128° C. UV spectrum had maxima at 228 and 305 mu. IR spectrum possessed the expected bands at 2.93μ (NH), 3.07μ (OH) and had no absorption in the oxo-region. This product, 2-methyl-5,6-dimethoxy-tryptophol (III) (3.5 g.=0.0141) is dissolved in pyridine (10 ml.) and methanesulfonyl chloride (1.78 g.=1.2 ml. 0.0155 mole) is added at once. The reaction mixture is permitted to stand for 5 hours, forming corresponding chloroethyl compound 2-methyl-3-β-chloroethyl-5,6-dimethoxy-indole which is thereupon treated with 4-phenyl-4-carbethoxypiperidine ("Norpethidine"). (It is liberated from 12.5 g. (=0.0456 mole) of norpethidine hydrochloride). The reaction mixture is heated to 32° C. and allowed to stand overnight at room temperature. It is taken up in ether and washed with water. The ether layer, containing the free base, is treated with diluted hydrochloric acid and crystals of 2-methyl - 3-β-(4-phenyl-4-carbethoxypiperidino)ethyl-5,6-dimethoxyindole hydrochloride (IV) separates out. M.P. is 191.5–92.5° C. UV spectrum possessed maxima at 227, 305, and 311 mu. IR spectrum had the expected bands at 3.10μ (NH), 3.60–4.25μ (salt band) and 5.78μ (ester). Found: C, 66.87; H, 7.16; N, 5.68%. $C_{27}H_{35}N_2O_4Cl$ requires: C, 66.60; H, 7.24; N, 5.75%.

*Example II*

Following the procedure of Example I, using indole-3-ethanol in place of 2-methyl-5,6-dimethoxy-tryptophol, results in 3-β-(4-phenyl-4-carbethoxypiperidino)ethylindole.

*Example III*

Following the procedure of Example I, but using 2-methyl-3-β-hydroxyethyl-5,6-methylenedioxyindole, which is prepared from 3,4-methylenedioxyaniline, 2-methyl-3-β - (4-phenyl-4-carbethoxypiperidino)ethyl-5,6-methylenedioxyindole is prepared.

*Example IV*

By using 5-methoxy-2-methyltryptophol in the method of Example I, 2-methyl-3-β-(4-phenyl-4-carbethoxypiperidino)ethyl-5-methoxyindole is produced.

*Example V*

By reacting 2-methyl-2-β-hydroxypropyl-5,6-dimethoxyindole with 4-phenyl-4-carbmethoxypiperidine according to Example I, 2-methyl-3-β-(4-phenyl-4-carbmethoxypiperidino)propyl-5,6-dimethoxyindole is prepared.

As described above the new compounds of the present invention may be used in the form of their pharmaceutically acceptable acid salts. Such salts are obtained according to conventional practice by treating the free base form of the alkyl indoles described with an acceptable organic or inorganic acid. Suitable acids for this purpose include hydrobromic, sulfuric, phosphoric, nitric, benzoic, methyl sulfonic, p-tolyl sulfonic, benzene sulfonic, naphthalene sulfonic, salicylic, glycolic, acetic, maleic, succinic, tartaric, stearic, palmitic, citric, glutaric, lactic and like acids.

While the foregoing invention has been described with some degree of particularity in the specific example and the results set forth in the table, it is to be understood that the invention is not to be limited hereby but is only to be limited by the claims appended hereto.

The invention claimed is:

1. A member of the group consisting of a compound of the formula:

[Structural formula showing indole with substituents $R^1$, $R^2$, $R^3$, $(CH_2)_n$, N-piperidine with $C_6H_5$ and $CO_2R^4$]

wherein $R^1$ and $R^2$ are selected from the group consisting of H and $OCH_3$ and $R^1$ and $R^2$ taken together are —$OCH_2O$—; $R^3$ is selected from the group consisting of H and $CH_3$; $R^4$ is lower alkyl having not more than 3 carbon atoms; $n$ has a value of from 2 to 3 inclusive and the pharmaceutically acceptable acid addition salts thereof.

2. A compound of the formula:

[Structural formula showing indole with substituents $R^1$, $R^2$, $R^3$, $(CH_2)_n$, N-piperidine with $C_6H_5$ and $CO_2R^4$]

wherein $R^1$ and $R^2$ are selected from the group consisting of H and OCH and $R^1$ and $R^2$ taken together are —$OCH_2O$—; $R^3$ is selected from the group consisting of H and $CH_3$; $R^4$ is lower alkyl having not more than 3 carbon atoms; and $n$ has a value of from 2 to 3 inclusive.

3. 2 - methyl - 3 - β-(4-phenyl-4-carbethoxypiperidino) ethyl-5,6-dimethoxyindole.

4. 3 - β-(4-phenyl-4-carbethoxypipeirdino)ethylindole.

5. 2 - methyl - 3-β-(4-phenyl-4-carbethoxypiperidino) ethyl-5,6-methylenedioxyindole.

6. 2 - methyl - 3-β-(4-phenyl-4-carbethoxypiperidino) ethyl-5-methoxyindole.

7. 2 - methyl - 3 - β-(4-phenyl-4-carbomethoxypiperidino)propyl-5,6-dimethoxyindole.

References Cited by the Examiner

UNITED STATES PATENTS

| | | | |
|---|---|---|---|
| 3,097,208 | 7/1963 | Elpern | 260—294.3 X |
| 3,112,308 | 11/1963 | Lowrie | 260—243 |
| 3,183,235 | 5/1965 | Zenitz | 260—294 |

OTHER REFERENCES

Hardy et al.: chapter V, "Analgetics," Medicinal chemistry, vol. 5, of a series of monographs, 187 and 191; edited by De Stevens, Academic Press, 1965, New York.

WALTER A. MODANCE, *Primary Examiner.*

AVROM D. SPEVACK, *Assistant Examiner.*